Nov. 24, 1959 N. S. FOCHT 2,914,143
SHOCK ABSORBER
Filed Jan. 24, 1951
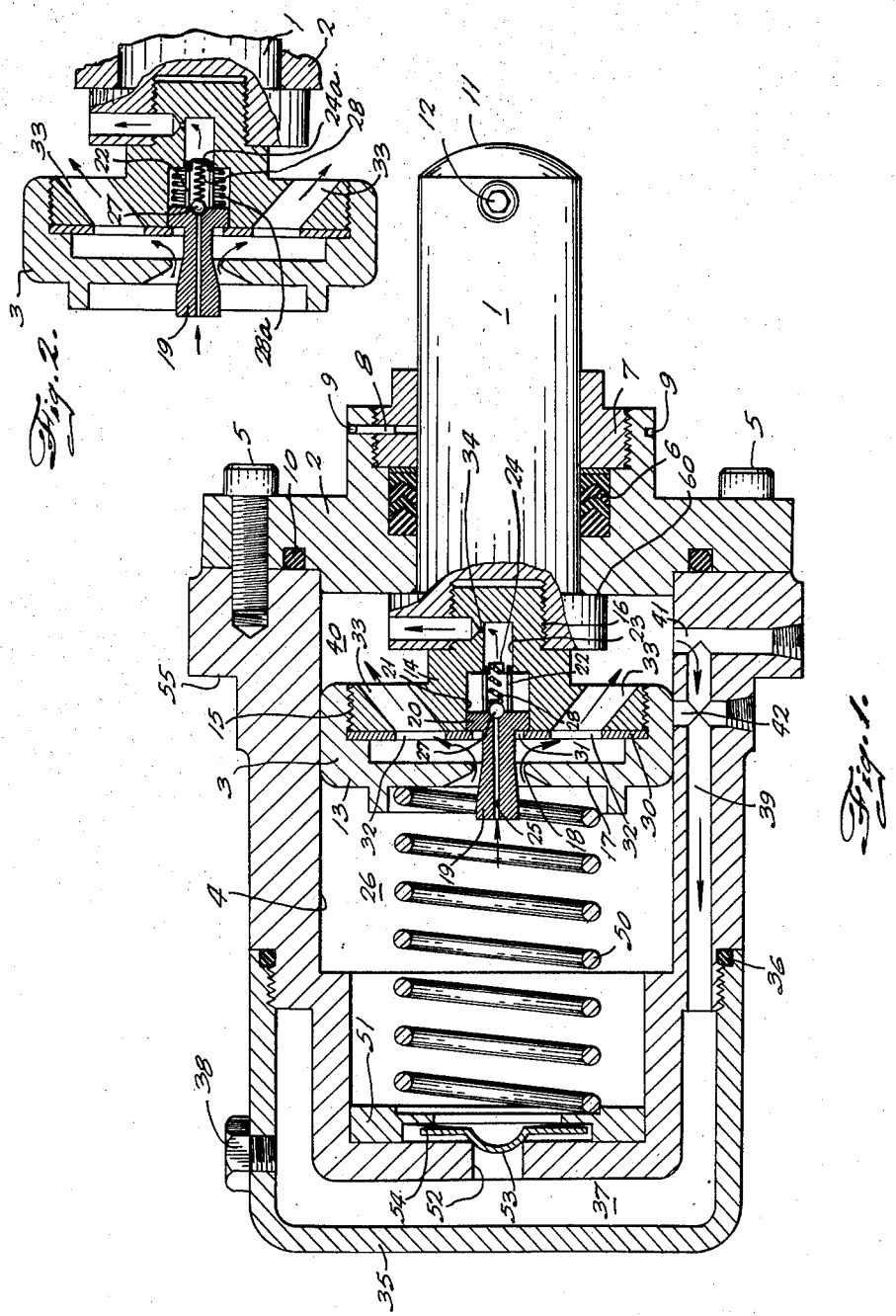
INVENTOR.
Nevin S. Focht
BY
ATTORNEY.

United States Patent Office 2,914,143
Patented Nov. 24, 1959

2,914,143

SHOCK ABSORBER

Nevin S. Focht, Garden City, N.Y.

Application January 24, 1951, Serial No. 207,475

2 Claims. (Cl. 188—88)

This invention relates to improvements in shock absorbers.

More particularly, the invention is concerned with providing a hydraulic shock absorber capable of absorbing a force in the nature of an impact or recoil, and it is an object of the invention to make provision in a device of this character for arresting the recoil or impact with maximum efficiency without danger of peaking.

The present invention is an improvement on that disclosed in my previously filed application Serial No. 179,567, filed August 15, 1950, for Shock Absorbers and now Patent No. 2,865,396. In that application, a shock absorber intended primarily for use with vehicles is disclosed, and accordingly, provision is made for dealing with a variety of frequencies and amplitudes. The shock absorber of the present invention is intended more particularly for applications in which a single recoil or impact is to be absorbed or where separate provision is made for dealing with disturbances of smaller amplitude and relatively high frequency. Shock absorbers or buffers of this character may be used in a variety of applications, as in absorbing impacts in launching devices of various characters, in absorbing recoil of guns, in absorbing impact due to landing of a mass, such as an aircraft, and in absorbing inertia forces in mountings for instruments and other devices on unstable platforms. It is an object of the invention to provide a shock absorber or buffer, providing for an ideal desired characteristic for a variety of applications.

With the foregoing and other objects which will appear in the following description in mind, the invention consists in the combinations and arrangements of parts and details of construction which will now first be fully described with reference to the accompanying drawing and then be more particularly pointed out in the appended claims.

The drawing illustrates a shock absorber embodying the invention in a preferred form, Fig. 1 is a central longitudinal section therethrough, and Fig. 2 is a detail view showing a modification.

The buffer piston rod 1 is reciprocably mounted in a cylinder head 2 and the piston 3 attached to the rod reciprocates within the cylinder 4. The head 2 may be fastened to the cylinder 4 as by means of bolts 5 and is provided with a gland including packing material 6 and threaded cap 7 for holding it in position. The cap 7 may be secured in position as by means of pin 8 held in place by a split retaining ring 9. The piston head 2 is sealed to the cylinder 4 by an O-ring 10.

The piston rod 1 may be formed with a suitably shaped outer end 11 for taking impact directly, or may have a suitable coupling or impact absorbing head attached to it as by means of set screws 12. The piston 3 comprises an inner body 13 fitting within the bore 4 and an outer body 14 screwed into the body 13 as indicated at 15, and screwed into the piston rod 1 as indicated at 16. The inner body 13 comprises an orifice plate section 17 having a central opening or orifice 18 surrounding a metering pin 19. The metering pin 19 has an enlarged end 20, forming a piston reciprocably carried in a bore 21 of the body 14, forming therewith a dash pot for controlling movement of the metering pin as hereinafter described. The metering pin further has a tubular neck or extension 22, which reciprocates in a reduced bore 23 in the body 14 and serves together with the piston portion 20 to guide the metering pin in its movements. The tubular section 22 is formed with slots accommodating a cross piece 24 which seats against the end of the bore 21. A central bore 25 provides for communication between the working space 26 beyond the piston and the dash pot cylinder 21, flow through this bore being controlled by a check valve comprising a ball 27 and a spring 28 which sits against the ball at one end and against the cross piece 24 at the other. The specific form of the elements just described forms no part of the present invention and is fully disclosed in my application above referred to, and hence requires no further description herein.

A washer 30 having a central opening 31 to accommodate the metering pin 19 and a number of openings 32 registering with bores 33 in the body 14 is provided. The washer is held between the bodies 13 and 14 as shown, and serves to limit movement of the metering pin outwardly from the bore 21 beyond the position shown.

An orifice 34 permits restricted flow from the dash pot bore, controlling the metering pin movement as described below.

An outer shell 35 is screwed onto the cylinder body 4 as shown, and sealed thereto as by O-ring 36. A space 37 serves as an oil reservoir exterior to the cylinder 4 and may accommodate a trapped body of air in its upper portion adjacent the plug 38. It will be understood that the buffer disclosed is intended for horizontal operation and that the configuration or location of the reservoir space 37 may be altered as desired to locate the air space properly with reference to the various ports and passages, where the buffer is to be used in a vertical or other different position.

A passage 39 permits flow from the space 40, within the cylinder 4 between the piston 3 and the cylinder head 2, into the reservoir space 37. The passage 39 communicates at all times with the space 40 through a passage 41 and also communicates with this space through a port 42 which is blocked by the piston 3 in the position of the figure.

A spring 50 urges the piston outwardly (to the right in the figure), this spring seating in a recess in the piston body 13 and in an annular end plate or washer 51 at the end of the cylinder 4. A port 52 provides for communication between the reservoir space 37 and the space 26 within the cylinder 4, and is closed off by a check valve comprising a valve body 53 and annular spring 54. The specific form of this check valve forms no part of the present invention. It is fully described in my application above referred to and will not be further described herein.

The buffer may be mounted in any convenient manner and conveniently supported against the thrust applied to the rod 1 by seating shoulder 55 on the cylinder body against a suitable supporting structure.

The general direction of flow in the energy absorbing or compression stroke of the device is indicated by the arrows in the figure. As the force applied to the piston rod 1 forces the piston into the cylinder (leftward in the figure), the pressure within space 26 keeps the refill valve 53 closed and the hydraulic fluid, typically oil, is forced to flow through the annular orifice between metering pin 19 and the edge of the opening 18 in the orifice plate, It passes without substantial restriction through the openings 32 and bores 33 into the space 40 and thence through passages 41 and 39 into the reservoir space 37. This space is of sufficient volume to accommodate the oil flow resulting from the difference in area of the two sides of the piston due to the piston rod and the device is filled with sufficient oil to keep the port 52 covered at all times. When the movement of the piston 3 has uncovered the port 42, oil may also pass through this port from the space 40, but in view of the areas involved and the rates of flow this does not affect the action on the compression stroke. The oil in flowing through the annular orifice around the metering pin 19 will create a pressure drop so that the higher pressure within working space 26 by comparison with space 40 and the space within the dash pot cylinder 21 tends to drive the metering pin in a direction opposite to the movement of the piston 3 (to the right in the figure). The oil, however, must pass through the dash pot orifice 34 and the pressure drop thereby created retards and regulates the movement of the metering pin 19.

As will be apparent two actions are possible, depending on whether the ball check 27 is unseated or not. If the ball check 27 is not unseated, the metering pin 19 will continue to move into the dash pot chamber 21, thus gradually closing down the annular orifice around the pin. The pin is tapered so as to reduce the orifice opening gradually as the metering pin moves inwardly in the dash pot chamber 21 (to the right in the figure). The metering pin is tapered and the orifice 34 is dimensioned so that energy may be absorbed substantially uniformly during a complete stroke of the piston 3, provided the impact to be absorbed is below a predetermined magnitude.

For purposes of considering the action, it may be assumed that the rod 1 is struck by a given mass travelling at a given velocity. Since the work done and the energy absorbed are equal to the force times the distance of travel, it will be apparent that an optimum condition is obtained, if the pressure difference between spaces 26 and 40 is constant during the working stroke. The kinetic energy of the moving mass will then be reduced in direct proportion to the travel of the piston and the speed of movement of the mass and of the buffer piston 3 driven thereby will be reduced proportionally to the square root of the distance traveled after impact. The pressure difference between spaces 26 and 40 depends upon the rate of oil flow through the orifice around the metering pin (which is proportional to the rate of travel of the piston 3) and the size of the orifice around the pin. The relative areas, orifice size, taper of the pin 19 may thus be readily calculated for any desired service.

Should the pressure in space 26 rise above the predetermined value, this pressure being communicated to ball 27 through the bore 25 will unseat the ball, permitting flow into the dash pot chamber 21. As soon as this occurs, the flow through orifice 34 will be increased, thus raising the pressure within the dash pot chamber 21 and tending to drive the metering pin backwardly (to the left in the figure). The backward movement of the metering pin, in turn, increases the opening through the orifice around the metering pin, thus lowering the pressure in space 26 and permitting the ball 27 to reseat. It will be noted that the pressure within the dash pot chamber 21 while oil is flowing through the passage 25, will not be the full pressure within the space 26 but will be reduced by the pressure drop through the orifice between the ball and its seat, when the ball is slightly relieved. However, the area of the metering pin piston 20 being greater than the area of the metering pin in the opening 18 of the orifice plate, or effective area for which the pressure in space 26 is applied, it is possible for the lower pressure in the dash pot chamber 21 to drive the metering pin back against the higher pressure in the space 26. As the metering pin piston 20 moves into the dash pot cylinder, the spring 28 is compressed, thus increasing the pressure required in the space 26 to unseat the ball 27. If the spring is prestressed and is of sufficient length, this will not unduly affect the constancy of the pressure difference between space 26 and space 40 during a stroke. The resistance will tend to rise gradually in absorbing the impact. Alternatively, the arrangement of Figure 2 may be substituted. In this arrangement, the spring 28 is positioned between the ball 27 and an end member 24a, corresponding to the cross piece 24 previously described, but fixed to the tubular part of the metering pin body without extending outwardly therefrom, so that the element 28a moves with the metering pin. In consequence, the spring 28 in the embodiment of Figure 2 will not be compressed by the motion of the metering pin and the pressure difference required to unseat the ball 27 will be constant. In the embodiment of Figure 2, a spring 28a for returning the metering pin to the position of the figure is provided.

In the embodiment illustrated, it is contemplated that the variation in air pressure in space 37 and the variation in compression in spring 50 will be of such small magnitude by comparison with the resistance due to pressure within the space 26, as to be to all intents and purposes negligible. As will be apparent to those skilled in the art, the spring 50 may also be made sufficiently heavy and the reservoir chamber 35 may also be designed so that the energy absorbed in compressing the spring and the air will be substantial and will play a significant part in cushioning the impact. The shock absorber may also be utilized in conjunction with an external spring or pneumatic system where desired. Any such mechanical or pneumatic spring effect which will be utilized in conjunction with the shock absorber will merely have the effect of altering somewhat the shock absorber characteristic which is desired and such alteration can readily be provided for by variation in the metering pin taper and in the orifice size in a manner which will be obvious to those skilled in the art.

It should be noted that the action of the shock absorber is largely independent of changes in viscosity of the oil due to temperature or other reasons. The passage 25 in the metering pin is preferably large by comparison with orifice 34 from the dash pot space, so that frictional resistance to flow through this passage will be only slight and the effective orifice or restriction on the flow leading to the dash pot will be between the ball 27 and its seat. Since when the ball unseats the orifice leading to dash pot cylinder 1 and the orifice 34 leading out of it are in series, the pressure drops may be made substantially proportional to each other regardless of the viscosity of the oil so that the backing up of the metering pin to increase the orifice or flow through opening 18 will depend upon the pressures but will be substantially independent of viscosity. Thus, if the oil is more viscous, a balanced position of the metering pin providing a greater area for flow through the opening 18 will automatically be provided for, so that the pressure drop flowing through this opening may be constant.

It has been found possible with the device of the invention to obtain substantially constant resistance to impacts of a mass when the initial impact velocity varies through an extremely wide range, the maximum velocity being several thousand percent as great as the minimum. Regardless of the impact velocity within this range, the resisting force to be maintained forces through substantially the whole energy absorption stroke until the velocity has been reduced to less than one percent of the original and absorption of the remaining energy presents no problem. Where the mass of the body whose impact is to be absorbed is varied, the device when constructed according to the embodiment of Figure 2 will nevertheless offer a uniform resistance. In this case, wherever impact by mass greater than normally expected may occur, provision for handling such impact may be made by merely elongating the cylinder somewhat, so as to provide for a greater stroke. Alternatively, selection of a suitable spring 28 for use in the embodiment of Figure 1 will permit absorption of impact by a body of increased mass with the same stroke, the pressure rising sufficiently to permit this. In all cases, any peaking or sudden rise in the pressures far above the designed values is prevented.

When the load is removed from piston 1, it is returned to the position of the drawing by spring 50, this return being quite rapid since the valve 53 unseating permits filling of the space 26 from reservoir 37. At the same time, the oil in the space 40 is circulated back through passage 39 into the reservoir space. As the piston nears the position of the figure in its return movement, it closes off the port 42, thus requiring the oil in the space 40 to flow through passage 41. In view of the rapidity of movement, sufficient pressure drop in this passage may now be created so as to cushion the remainder of the stroke and avoid slamming the piston rod collar 60 against the head 2.

The arrangement shown in the drawing in which the metering valve is located in the piston of the working cylinder is preferred for most applications for a variety of reasons, these being principally concerned with compactness and with avoidance of external piping or connections. Where preferred, however, it will be apparent that the metering pin and associated mechanism may be located externally to the cylinder and connected thereto by conduits or passages leading to the spaces 26 and 40, the effect being that the oil instead of passing through the piston from the space 26 to the space 40, is by-passed around the piston. This construction while somewhat more complicated possesses certain advantages in ease of servicing the equipment.

What is claimed is:

1. A hydraulic shock absorber comprising a cooperating piston and cylinder defining a working space, and metering valve means for controlling flow from the working space comprising a movable orifice varying element subjected to working space pressure for moving it so as gradually to reduce the area for flow from the working space from a predetermined larger area to a predetermined smaller area, means mounting the said movable orifice varying element for movement independently of relative movement between the said piston and cylinder, yielding means for holding the element in position corresponding to the said larger area for flow, a dash pot resisting movement of the said element and a check valve for admitting fluid from the working space into the dash pot, the check valve having a spring acting between relatively movable dash pot elements and compressing as the orifice varying element moves under working space pressure, whereby the unloading pressure of the check valve increases.

2. A shock absorber according to claim 1, in which the dash pot is dimensioned for permitting fluid from the working space to move the orifice varying element back to increase the flow area upon unloading of the check valve so as to admit fluid from the working space into the dash pot.

References Cited in the file of this patent

UNITED STATES PATENTS

| | | |
|---|---|---|
| 2,095,112 | Wallace | Oct. 5, 1937 |
| 2,161,811 | Grebe | June 13, 1939 |
| 2,212,541 | Isaacson | Aug. 27, 1940 |
| 2,248,865 | Griepenstroh | July 8, 1941 |
| 2,325,430 | Setz | July 27, 1943 |
| 2,403,648 | Focht | July 9, 1946 |
| 2,465,680 | Focht | Mar. 29, 1949 |

FOREIGN PATENTS

| | | |
|---|---|---|
| 400,382 | Great Britain | Oct. 26, 1933 |